United States Patent [19]

Day et al.

[11] Patent Number: 5,480,540

[45] Date of Patent: Jan. 2, 1996

[54] SPRAY APPARATUS FOR SEPARATING SOLIDS FROM FLUIDS

[75] Inventors: James Day, Scotia; Ganesh Kailasam, Schenectady; Godavarthi S. Varadarajan, Niskayuna, all of N.Y.

[73] Assignee: General Electric Company, Schenectady, N.Y.

[21] Appl. No.: 324,306

[22] Filed: Oct. 17, 1994

[51] Int. Cl.⁶ .................... B01D 11/04; B01D 43/00
[52] U.S. Cl. .................. 210/181; 210/195.1; 210/197; 210/209; 210/219; 210/519
[58] Field of Search .................... 210/181, 197, 210/195.1, 195.3, 209, 219, 519; 422/101

[56] References Cited

U.S. PATENT DOCUMENTS

| | | | |
|---|---|---|---|
| 2,717,873 | 9/1955 | Montgomery et al. | 210/197 |
| 3,184,065 | 5/1965 | Bradford | 210/519 |
| 3,732,163 | 5/1973 | Lapidot | 210/181 |
| 4,094,783 | 6/1978 | Jackson | 210/519 |
| 4,224,157 | 9/1980 | Jain | 210/209 |
| 4,812,233 | 3/1989 | Coenen et al. | 210/181 |
| 5,073,266 | 12/1991 | Ball, IV | 210/519 |
| 5,280,701 | 1/1994 | Tolman | 210/181 |
| 5,386,055 | 1/1995 | Lee et al. | 210/181 |

OTHER PUBLICATIONS

Randolph et al., Biotechnol. Prog. 1993, vol. 9, No. 4, "Sub-Micrometer-Sized Biodegradable Particles of Poly(L-Lactic Acid) Via the Gas Antisolvent Spray Precipitation Process", pp. 429–435.

Primary Examiner—Peter A. Hruskoci
Assistant Examiner—Theodore M. Green
Attorney, Agent, or Firm—Edward A. Squillante, Jr.; William H. Pittman

[57] ABSTRACT

A novel apparatus for separating solids from fluids is closed to the atmosphere and comprises a spray feed inlet, a distributor cup and a heat exchanger and it allows for solid recovery under pressure without requiring substantial solvent volatilization.

4 Claims, 1 Drawing Sheet

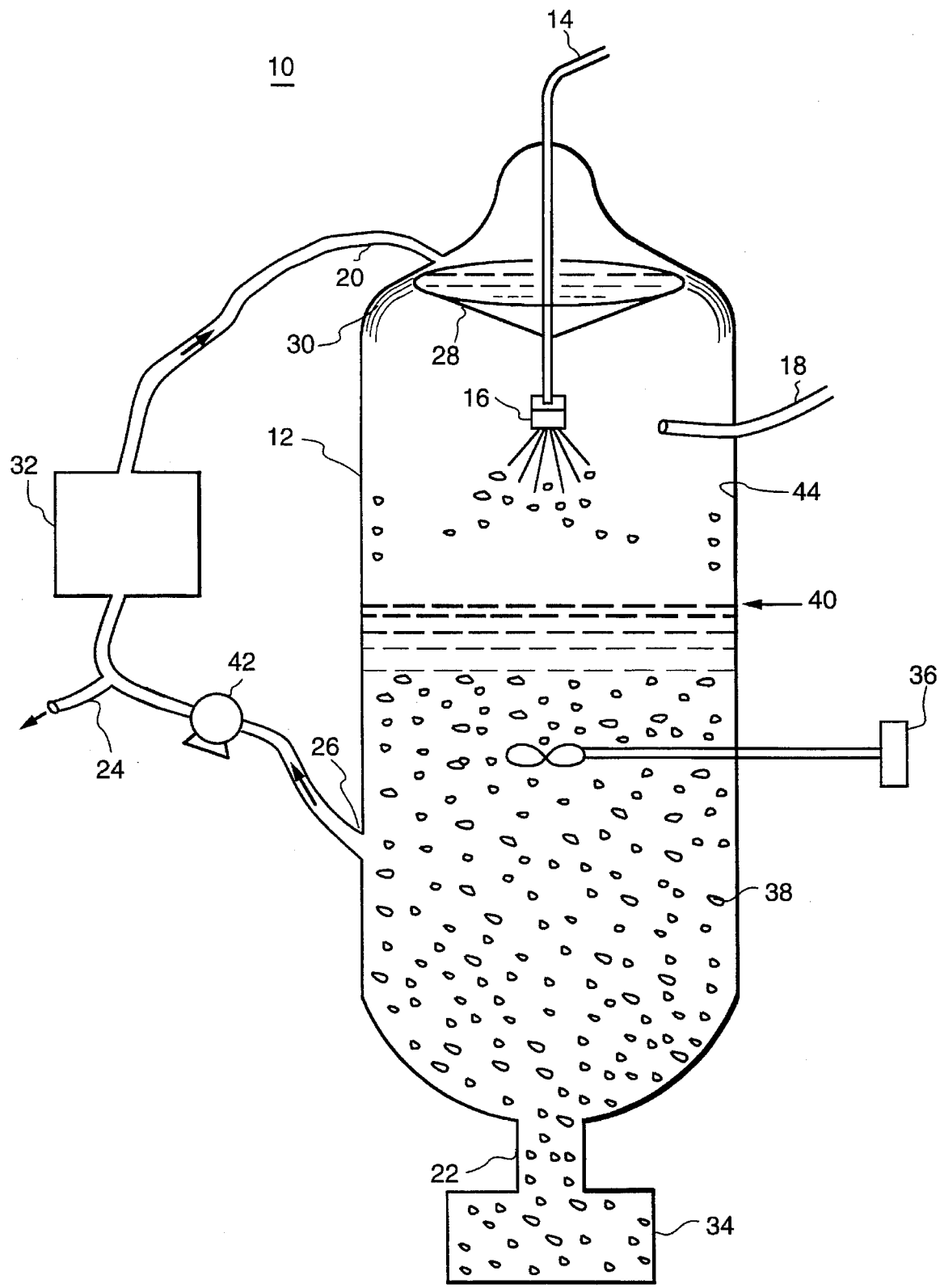

SPRAY APPARATUS FOR SEPARATING SOLIDS FROM FLUIDS

FIELD OF THE INVENTION

This invention relates to a novel apparatus for isolating solids from fluids. More particularly, said apparatus comprises a feed spray, a distributor cup and a heat exchanger which allows for solids to be separated from fluids under pressure.

1. Background of the Invention

For over a hundred years it has been well recognized that naturally occurring processes are inherently mixing processes and that the reverse procedure, unmixing or separation processes, typically creates challenging problems for engineers and the like. Nonetheless, many processes and apparatuses have been developed in order to transform a mixture of substances into two or more products which differ from each other in composition.

Conventional techniques which induce precipitation of solids from solutions in order to produce mixtures include crystallization, centrifugation, clarification and separation agent employment. Subsequent to mixture formation, the solids are separated from liquids by typical methods including evaporation, filtration, decanting and absorption. Such methods can be environmentally hazardous since they often require the vaporization and transporting of environmentally hazardous solvents as well as the employment of expensive reagents. Moreover, known separation devices usually perform at atmospheric pressure or pressures lower than atmospheric and they often require temperature elevation before any solids may be separated from fluids.

The instant invention, therefore, relates to a novel apparatus for isolating solids from fluids. More particularly, the apparatus comprises a feed spray, a distributor cup and a heat exchanger and the apparatus allows for solids and fluids to be separated from one another (batchwise or continuously) under pressure without employing inefficient, energy intensive and environmentally unfavorable steps.

2. Description of the Prior Art

Apparatuses for isolating solids from solution have been disclosed in the art. In commonly assigned U.S. Pat. Nos. 4,603,194 and 4,634,761, volatilization vessels open to the atmosphere are disclosed. Said vessels comprise feed ports, outlet ports and impellers, wherein polymer solutions are fed into the vessel and heated in order to obtain polymer slurries which are subsequently centrifuged and dried in order to recover solid polymer.

Additionally, in commonly assigned U.S. Pat. No. 4,668,768, an evaporation vessel is described. Said evaporation vessel is charged with an organic solvent comprising polymer and an organic anti-solvent wherein a powdery polymer precipitate is recovered subsequent to vaporization.

In U.S. Pat. No. 5,306,807, efforts are disclosed for isolating polymers from solutions by subjecting the solutions to carbon dioxide, wherein the disclosure of said U.S. Patent is incorporated herein by reference.

Still other investigators have focused on the recovery of solids from solution. In German Patent 0,184,935 polymer resins are isolated from solution by charging a holding tank with a polymer solution and adding carbon dioxide containing fluids.

The instant invention is patentably distinguishable from the above-described since, among other reasons, it is directed to an apparatus for separating solids from fluids wherein said apparatus comprises a feed spray, a distributor cup and a heat exchanger and the apparatus allows for solids and liquids to be isolated under pressure. Moreover, in the instant invention, fluids are defined as liquids, solutions comprising solids and/or gases dissolved therein, suspensions and emulsions. Further, fluids in the instant invention can mean solvents including methylene chloride as well as mixtures of miscible or immiscible solvents.

SUMMARY OF THE INVENTION

Generally speaking, the instant invention relates to an apparatus for separating solids from fluids in a vessel from a solution or mixture comprising the same. Said apparatus allows for solid and fluid separation without the need for inefficient, energy intensive and environmentally unfavorable steps such as evaporation/volatilization of substantially all liquids (organic solvents), the necessary employment of anti-solvents and the employment of expensive separating/precipitation agents. Further, the instant apparatus may function at a variety of temperatures; however, ambient temperature is often preferred.

The needs of the instant invention are met by the above-described novel apparatus which comprises a vessel (closed to the atmosphere) having a solution feed spray inlet having at least one spray nozzle attached thereto, a gas component inlet, a recirculated liquid component inlet, a particle component outlet as well as a liquid component outlet having a filter attached thereto, a distributor cup, a heat exchanger, a collecting vessel and an optional motor driven agitator.

It is often preferred that the particle component outlet is positioned at the bottom of the vessel. However, any arrangement which allows for solid particles to exit the vessel will work; especially in the case where the solid particles are less dense than the fluid. Moreover, the collecting vessel is defined as any mechanism capable of collecting particles from the vessel and maintaining the pressure in the vessel. Additionally, the definition of said collecting vessel is meant to include barrels comprising stationary augers and movable anterior caps as well as barrels comprising movable augers and stationary anterior seals. Such barrels are disclosed in commonly assigned U.S. applications Ser. Nos. 08/175,458 and 08/268,367, the disclosures of which are incorporated herein by reference.

BRIEF DESCRIPTION OF THE DRAWING

The subject matter which is regarded as the invention is particularly pointed out and distinctly claimed in the concluding portion of the specification. The invention, however, may be best understood by reference to the following description taken in conjunction with the accompanying drawing figure in which:

The figure is a schematic drawing of a side view of the apparatus of the present invention. It depicts the vessel comprising a spray inlet with a spray nozzle, a distributor cup, a heat exchanger and a collecting vessel with solid particles.

DETAILED DESCRIPTION OF THE PREFERRED EMBODIMENTS

Referring to the figure, an apparatus 10 for separating solids from fluids is shown. The apparatus 10 comprises a vessel 12 having a solution feed spray inlet 14 with at least one spray nozzle 16 attached thereto, a gas component inlet 18 and a recirculated liquid component inlet 20. The vessel 12 further comprises a particle component outlet 22, a liquid component outlet 24 with a filter 26 attached thereto, a distributor cup 28 for liquid overflow 30, a heat exchanger 32, a collecting vessel 34 and an optional motor driven agitator 36.

The instant invention is not limited to any particular solids or fluids being isolated. If in fact a solution is introduced into the vessel 12 by way of the feed spray inlet 14, the gas being supplied into the gas component inlet 18 generally induces precipitation of solid particles from solution. Such precipitation is accelerated by the fact that a sprayed solution has a large surface area for gas contact, and in this instance, the gas typically dissolves in the solution resulting in solid precipitation. The motor driven impeller 36 may be employed in order to enhance the gas dissolution. However, if a mixture is supplied to the vessel 12 via the solution feed spray inlet 14, the gas is not employed to induce precipitation in the mixture since solid to be separated is already present.

In all instances, however, it is preferred to supply a gas to the vessel 12 via the gas component inlet 18 since it is preferable for the pressure inside the mixing vessel to be greater than the external pressure. Often, it is preferred that the pressure is about 400 psig to about 800 psig inside said vessel 12, including all ranges subsumed therein. However, the apparatus will function at lower pressures when mixtures are introduced.

Subsequent to charging the vessel 12 with solution via the solution feed spray inlet 14, solid particles 38 precipitate out of the solution as a result of its contact with the gas supplied to said vessel 12 via the gas component inlet 18 and the pressure within the vessel 12. The density of the solid particles 38 causes the solid particles 38 to settle to the bottom of the vessel 12 and pass through the particle passage 22 into the collecting vessel 34. It is noted that the fluid level 40 within the vessel 12 remains constant and such fluid level can be controlled by any conventional means including those which employ a control valve. This is accomplished by the passage of liquid or liquid and gas under pressure through the filter 26 and into the liquid component outlet 24. Moreover, it is within the scope of the instant invention to employ a pump 42 for the recirculation of fluid from the vessel 12.

Additionally, a portion of the fluid removed via the fluid component outlet 24 is diverted to a heat exchanger 32. The heat exchanger 32 is employed to cool the liquid which increases in temperature when gases such as carbon dioxide dissolve therein. The liquid that passes to the heat exchanger subsequently is recirculated to the vessel 12 via the recirculated liquid component inlet 20. The recirculated liquid is then contacted with the distributor cup 28 which allows for liquid overflow 30 to wash the inner walls 44 of the vessel 12 to prevent any solid particles 38 from adhering thereon.

It is often important to regulate the temperature of the recirculated liquid since temperature can affect the physical properties of the solid particles 38 and gases in the vessel 12. Additionally, it is noted herein that there is no limitation with respect to the shape of the distributor cup 28 or the material from which it is made. The only requirements with respect to the distributor cup 28 are that the distributor cup 28 is in conjunction with the recirculated liquid component inlet 20 allowing for liquid overflow 30 and that the distributor cup does not decompose or dissolve within the vessel 12.

The following example is provided to further facilitate the understanding of the invention and is not intended to limit the instant invention.

EXAMPLE

A 95 L vessel 12 equipped with a motor driven impeller 36 was charged with 9.5 l of methylene chloride. $CO_2$ at 600 psig was introduced into the vessel 12 and the resulting mixture was stirred at 1750 rpm until equilibrium was reached. A bisphenol A polycarbonate (BPA) solution comprising 18% by weight polycarbonate and 82% by weight methylene chloride was sprayed into the mixing vessel 12 via the feed spray inlet 14. The mixing vessel 12 was then continuously charged with $CO_2$ at 600 psig until polycarbonate precipitated and was collected as solid particles 38. The solid particles 38 entered the collecting vessel 34 of the apparatus 10. Liquid was removed via the liquid component outlet 24 in order to maintain a constant liquid level 40 in the vessel. A portion of the liquid that was removed via the liquid component outlet 24 was diverted to a heat exchanger 32 and recirculated back into the vessel 12 via the recirculated liquid component inlet 20. All recirculated liquid flowed off of the distributor cup 28 to wash the inner walls 44 of the vessel 12. Solid particles 58 (polycarbonate) were then removed from the collecting vessel 34 and dried.

What is claimed is:

1. An apparatus for separating solids from fluids, said apparatus is closed to the atmosphere and pressurized and has a vessel comprising:

(a) a feed spray inlet having a spray nozzle attached thereon;

(b) a gas component inlet;

(c) a recirculated liquid component inlet in conjunction with a distributor cup allowing for liquid overflow;

(d) a liquid component outlet having a filter thereon;

(e) a heat exchanger;

(f) means for recirculating filtered liquid component from said liquid component outlet through said heat exchanger and into said recirculated liquid component inlet; and (g) a particle passage having a collecting vessel attached thereto.

2. An apparatus in accordance with claim 1 wherein said apparatus has an internal pressure of about 400 psig to about 800 psig.

3. An apparatus in accordance with claim 1 wherein said apparatus further comprises a motor driven impeller.

4. An apparatus in accordance with claim 1 wherein said means for recirculating further comprises a pump attached to assist in liquid recirculation.

* * * * *